US010807209B2

(12) United States Patent
Wang et al.

(10) Patent No.: US 10,807,209 B2
(45) Date of Patent: Oct. 20, 2020

(54) CLOSED-LOOP FLUID CONTROL TO OBTAIN EFFICIENT MACHINING

(71) Applicant: United Technologies Corporation, Farmington, CT (US)

(72) Inventors: Zhigang Wang, South Windsor, CT (US); Changsheng Guo, South Windsor, CT (US); Daniel V. Viens, North Hero, VT (US)

(73) Assignee: Raytheon Technologies Corporation, Farmington, CT (US)

( * ) Notice: Subject to any disclaimer, the term of this patent is extended or adjusted under 35 U.S.C. 154(b) by 120 days.

(21) Appl. No.: 15/916,683

(22) Filed: Mar. 9, 2018

(65) Prior Publication Data

US 2019/0275627 A1    Sep. 12, 2019

(51) Int. Cl.
*B23Q 11/10* (2006.01)
*B23Q 11/12* (2006.01)
*B23Q 17/00* (2006.01)
*F16N 29/02* (2006.01)
*B23Q 17/09* (2006.01)

(52) U.S. Cl.
CPC ...... *B23Q 11/1038* (2013.01); *B23Q 11/1046* (2013.01); *B23Q 11/12* (2013.01); *B23Q 17/007* (2013.01); *B23Q 17/0961* (2013.01); *F16N 29/02* (2013.01); *F16N 2250/04* (2013.01); *F16N 2250/40* (2013.01); *F16N 2270/20* (2013.01); *G05B 2219/49043* (2013.01)

(58) Field of Classification Search
CPC .. B23Q 11/1038; B23Q 17/007; B23Q 11/12; F16N 29/02; F16N 2270/20; F16N 2250/04; F16N 2250/40; G05B 2219/49043

USPC .......................................................... 700/56
See application file for complete search history.

(56) References Cited

U.S. PATENT DOCUMENTS

| | | | | | |
|---|---|---|---|---|---|
| 4,076,442 | A | * | 2/1978 | Cox, Jr. ............ | B23Q 11/1038 408/11 |
| 5,678,466 | A | * | 10/1997 | Wahl ..................... | B23D 59/02 83/168 |
| 6,210,086 | B1 | * | 4/2001 | Lecornet ........... | B23Q 11/0042 408/67 |

(Continued)

FOREIGN PATENT DOCUMENTS

| JP | 2015123567 A | 7/2015 |
|---|---|---|
| KR | 20140066824 A | 6/2014 |
| TW | 201620666 A | 6/2016 |

OTHER PUBLICATIONS

EP search report for EP19161843.8 dated Sep. 23, 2019.

*Primary Examiner* — Kenneth M Lo
*Assistant Examiner* — Mohammed Shafayet
(74) *Attorney, Agent, or Firm* — Getz Balich LLC (57) ABSTRACT

A system includes a machine tool that includes a cutting tool, a fluid subsystem that provides fluid to the cutting tool, and at least one processor that executes instructions that cause the at least one processor to: obtain a signal indicative of a load on the cutting tool, establish a first value of at least one parameter of the fluid based on the signal, obtain a second value of the at least one parameter that is based on a simulation, determine a difference between the first value and the second value, and adjust a state of a device of the fluid subsystem based on the determined difference.

14 Claims, 11 Drawing Sheets

(56) References Cited

U.S. PATENT DOCUMENTS

| | | | |
|---|---|---|---|
| 6,311,100 B1* | 10/2001 | Sarma | G05B 19/4097 |
| | | | 700/186 |
| 8,672,593 B2 | 3/2014 | Sato et al. | |
| 8,821,212 B2 | 9/2014 | Leishman et al. | |
| 9,128,810 B1* | 9/2015 | Blaine | A22C 17/002 |
| 2005/0154490 A1* | 7/2005 | Blaine | A22C 17/0086 |
| | | | 700/186 |
| 2006/0089745 A1* | 4/2006 | Suzuki | G05B 19/404 |
| | | | 700/176 |
| 2008/0096473 A1* | 4/2008 | Mukai | B24B 49/00 |
| | | | 451/53 |
| 2012/0245742 A1* | 9/2012 | Clausmann | B23Q 11/10 |
| | | | 700/282 |
| 2014/0038496 A1* | 2/2014 | Leishman | B23Q 11/1038 |
| | | | 451/53 |
| 2014/0196273 A1* | 7/2014 | Balaji | B23Q 11/1046 |
| | | | 29/557 |
| 2014/0271002 A1* | 9/2014 | Hoshino | B23Q 11/10 |
| | | | 408/56 |
| 2014/0277686 A1* | 9/2014 | Wang | B23C 5/00 |
| | | | 700/160 |
| 2015/0107818 A1* | 4/2015 | Fujii | F28F 27/02 |
| | | | 165/281 |
| 2016/0184947 A1* | 6/2016 | Itou | B23Q 11/0046 |
| | | | 15/319 |
| 2017/0001255 A1* | 1/2017 | Winn | B23K 10/006 |
| 2017/0043442 A1* | 2/2017 | Takikawa | B23Q 11/005 |
| 2017/0357243 A1 | 12/2017 | Takayama et al. | |
| 2018/0355771 A1* | 12/2018 | Ruffet | F01M 1/10 |

* cited by examiner

CLOSED-LOOP FLUID CONTROL TO OBTAIN EFFICIENT MACHINING

BACKGROUND

Machine tools, such as for example computer numerical controlled (CNC) machine tools, have been utilized in many industries. Such machines may be used, for example, to manufacture complex/intricate metal components. Cutting fluids are frequently used as part of a machining procedure. Cutting fluids cool and lubricate cutting tools of a machine tool, thereby extending the operational lifetime of the tools. In addition to enhanced tool life, a particular formulation of a cutting fluid may increase/enhance a quality of a surface finish of a workpiece and reduce friction between a tool and the workpiece.

In a typical manufacturing environment, a coolant system applies cutting fluids with a constant flow rate, e.g., a heavy and continuous jet/stream of cutting fluid is applied to a cutting zone (where the cutting zone corresponds to the interface between a tool and a workpiece). As discussed above, the applied cutting fluids provide cooling and/or lubrication of the tool(s). Also, the cutting fluids facilitate a removal from the cutting zone of cutting chips that are liberated from the workpiece. For instance, a continuous stream of cutting fluids flush the cutting chips to a chip conveyer, where the conveyer carries the cutting, chips to a disposal container (e.g., a chip recycle container).

Even though the application of cutting fluids helps in terms of cooling and lubricating tools, the application of cutting fluid is accompanied by significant cost. For example, a continuous stream of cutting fluid during machining consumes enormous quantities of power and fluid. For example, in some heavy-duty machining cutting fluids may flow at a rate over 150 liters per minute. Although some of the cutting fluids may be recycled, the machining procedure still ends up consuming a large volume of cutting fluids; as such, a large capital investment associated with procurement, storage and handling of cutting fluids is required.

Typically, for high volume machining operations at least 16% of the machining cost is directly and indirectly associated with the cutting fluids. This cost does not account for risks to which operators are exposed when using these fluids. For example, cutting fluids may contain chemicals that require care (e.g., require specialized handling techniques/procedures). Conventionally, a cutting fluid has to be: (1) turned on and off by an operator, or (2) left running during periods when a tool is not engaged in cutting and cutting fluid flow is unnecessary.

Additionally, a distribution of heat to the cutting chips and the tool(s) during machining varies and is dependent on the thermal properties of the tool and the workpiece. For example, approximately 70% of cutting heat is carried away by chips in a machining of steel alloys; on the other hand, a majority of cutting heat is transferred to tools in machining of heat resistant alloys (e.g., titanium alloys). So, it is necessary to consider the differences in terms of heat distribution as part of a cutting fluid supply strategy.

Another issue encountered in machining operations deals with thermal shock. As a cutting edge of a tool engages a workpiece and a material (e.g., a chip) of the workpiece is liberated during a first cutting operation, friction between the cutting edge and the material of the workpiece causes the cutting edge to get hot almost immediately. However, as soon as the cutting edge is disengaged from the workpiece, and with the applied cutting fluid present, the cutting edge cools quickly. Thereafter, the cutting edge is engaged in a subsequent/second cutting operation and consequently heats-up again. The cycle is repeated, such that the alternating sequence of hot-cool-hot-cool with respect to the cutting edge produces a thermal shock condition. Thermal shock causes fatigue of the cutting edge. Research has indicated that removing the thermal shock (cycle) may extend tool life.

Efforts have been undertaken to reduce (e.g., minimize) the use of cutting fluids in order to obtain more environmentally benign manufacturing environments. Two techniques have been developed to reduce the use of cutting fluid. The first technique involves machining without any cutting fluid, and is frequently referred to as dry-cutting. The second technique is frequently referred to as cutting with a minimum quantity of lubrication (MQL), where a low/small amount of fluid is pulverized in a flow of compressed air. Both techniques reduce an amount of cutting fluid that is used. However, the techniques are less effective in providing cooling/lubrication to a cutting tool and evacuating cutting chips. The reduced cooling/lubrication results in a build-up of work material (e.g., chips) on the cutting edge of the tool, and consequently causes tool wear, thermal distortion of machined parts, re-cutting chips, and some other undesirable effects. Thus, dry-cutting and MQL have their own limitations, especially in conjunction with aerospace components that frequently include heat-resistant, high-strength alloys.

Accordingly, what is needed is an ability to reduce the usage cutting fluids while still obtaining extended/enhanced tool life, workpiece surface integrity/quality, predetermined cutting force or frictional characteristics, and adequate chip evacuation.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system comprising: a machine tool that includes a cutting tool, a fluid subsystem that provides fluid to the cutting tool, at least one processor that executes instructions that cause the at least one processor to: obtain a signal indicative of a load on the cutting tool, establish a first value of at least one parameter of the fluid based on the signal, obtain a second value of the at least one parameter that is based on a simulation, determine a difference between the first value and the second value, and adjust a state of a device of the fluid subsystem based on the determined difference. In some embodiments, the device includes a pump, and wherein a drive of the pump is adjusted based on the determined difference. In some embodiments, the device includes a valve, and wherein a degree that the value is open is adjusted based on the determined difference. In some embodiments, the at least one parameter includes a flow rate of the fluid. In some embodiments, the at least one parameter includes a pressure of the fluid. In some embodiments, the system further comprises a workpiece, wherein the second value of the at least one parameter is based on a material of the workpiece, a material of the cutting tool, an identification of a type of the fluid, a spindle speed associated with the machine tool, and a chip load. In some embodiments, the system further comprises a workpiece, a channel coupled to the fluid subsystem, and a filter that filters material that is liberated from the workpiece in the channel, wherein the channel returns the fluid to the fluid subsystem. In some embodiments, the system further comprises a flow rate sensor, and a pressure sensor, wherein the adjusted state of the device of the fluid subsystem is based on a flow rate output by the flow rate sensor and a pressure output by the pressure sensor. In some embodiments, the load is a spindle load of a motor of the machine tool. In some embodiments, the system further comprises a workpiece, wherein the second value is based on an identification of a node of the workpiece.

Aspects of the disclosure are directed to a method comprising: establishing a first state of a device included in a fluid subsystem, delivering, by the fluid subsystem, fluid to a cutting tool of a machine tool based on the first state, obtaining, by a controller that includes a processor, a signal indicative of a load on the cutting tool, establishing, by the controller, a first value of at least one parameter of the fluid based on the signal, obtaining, by the controller, a second value of the at least one parameter that is based on a simulation, determining, by the controller, a difference between the first value and the second value, and commanding, by the controller, a second state of the device based on the determined difference, the second state different from the first state. In some embodiments, the device includes a pump, and wherein a drive of the pump is adjusted based on the determined difference. In some embodiments, the adjustment of the drive of the pump includes shutting off the pump. In some embodiments, the device includes a valve, and wherein a degree that the value is open is adjusted based on the determined difference, in some embodiments, the at least one parameter includes a flow rate of the fluid. In some embodiments, the at least one parameter includes a pressure of the fluid. In some embodiments, the method comprises cutting a node of a workpiece by the cutting tool to generate at least one chip that is liberated from the workpiece, wherein the second value of the at least one parameter is based on a material of the workpiece, a material of the cutting tool, an identification of a type of the fluid, a spindle speed associated with the machine tool, a chip load associated with the at least one chip, a cutting depth into the workpiece at the node, an identification of an orientation of a cutting edge of the cutting tool relative to the node, and a cutting speed of the cutting tool. In some embodiments, the second state of the device accounts for a lag time between a first time corresponding to when a command is received by the device and a second time corresponding to a response to the command by the device. In some embodiments, the method comprises establishing a third value of the at least one parameter of the fluid based on the determined difference, and storing, in a memory, the third value. In some embodiments, the method comprises obtaining, by the controller, a second signal indicative of a second load on the cutting tool, establishing, by the controller, a fourth value of the at least one parameter of the fluid based on the second signal, determining, by the controller, a second difference between the fourth value and the third value, and commanding, by the controller, a third state of the device based on the determined second difference, the third state different from the second state.

BRIEF DESCRIPTION OF THE DRAWINGS

The present disclosure is illustrated by way of example and not limited in the accompanying figures in which like reference numerals indicate similar elements. The figures are not necessarily drawn to scale unless explicitly indicated otherwise.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

Figure 1:
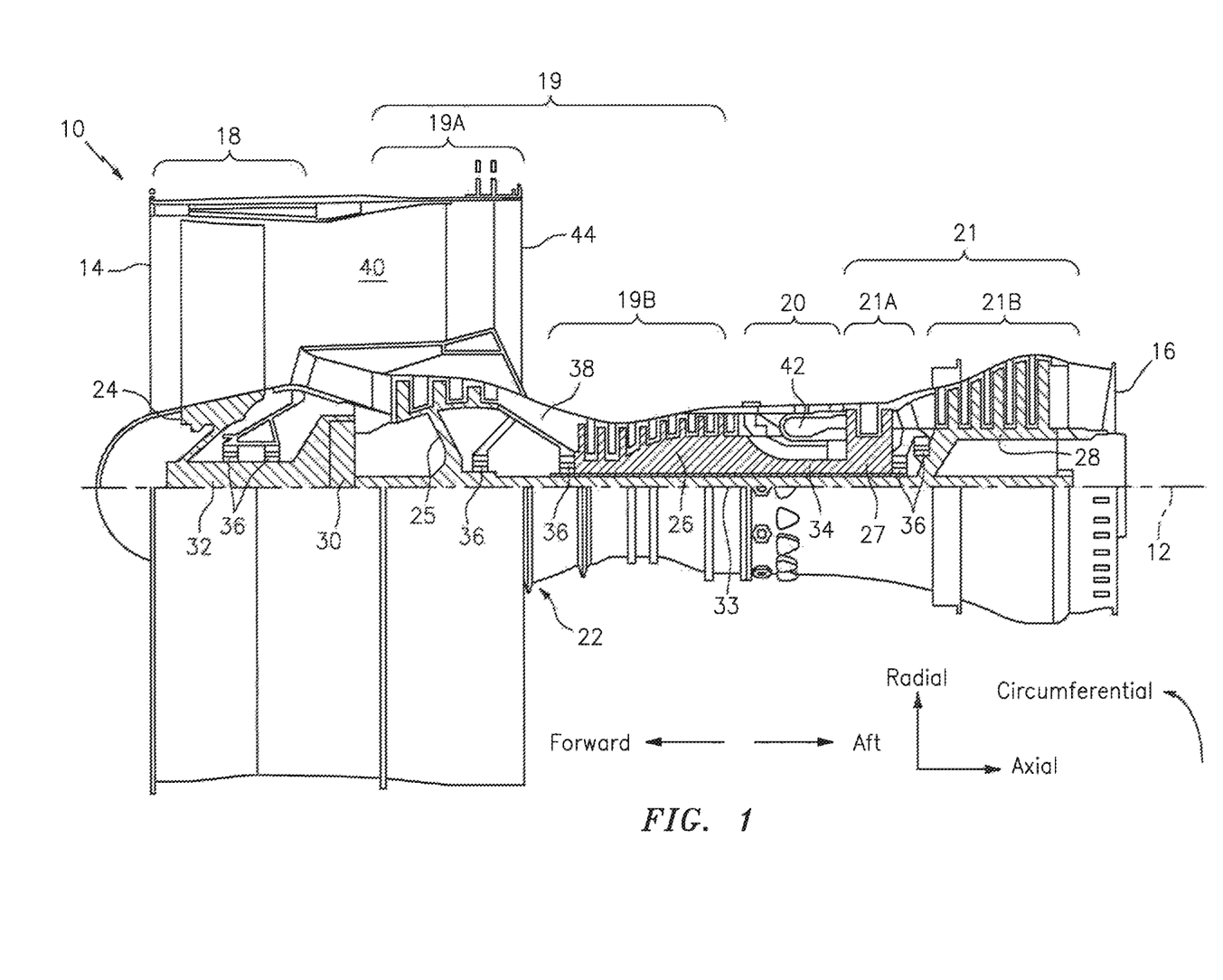
FIG. 1 is a side cutaway illustration of a gas turbine engine.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36 (e.g., rolling element and/or thrust bearings). Each of these bearings 36 is connected to the engine housing 22 by at least one stationary structure such as, for example, an annular support strut.

As one skilled in the art would appreciate, in some embodiments a fan drive gear system (FDGS), which may be incorporated as part of the gear train 30, may be used to separate the rotation of the fan rotor 24 from the rotation of the rotor 25 of the low pressure compressor section 19A and the rotor 28 of the low pressure turbine section 21B. For example, such an FDGS may allow the fan rotor 24 to rotate at a different (e.g., slower) speed relative to the rotors 25 and 28.

During operation, air enters the turbine engine 10 through the airflow inlet 14, and is directed through the fan section 18 and into a core gas path/duct 38 and a bypass gas path/duct 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection, with non-geared engines.

Aspects of the disclosure may be used to manufacture a component of an engine (e.g., the engine 10 of FIG. 1). For example, and referring to FIG. 2, a block diagram of a system 200 that may be used to manufacture a component is shown. The system 200 may include a workpiece 202 that may be machined via one or more tools (e.g., cutting tool 208) to include one or more features (e.g., a particular surface shape/contour). The cutting tool 208 is shown as including an edge 214 that may interface to the workpiece 202 as part of the machining. The edge 214 may be defined by one or more teeth. A profile of the edge 214 may be based on an identification of the type of component that is being manufactured; stated differently, a first type of cutting tool 208/edge 214 may be used to manufacture/fabricate a first type of component and a second type of cutting tool 208/edge 214 may be used to manufacture/fabricate a second type of component that is different from the first type of component.

Figure 2:
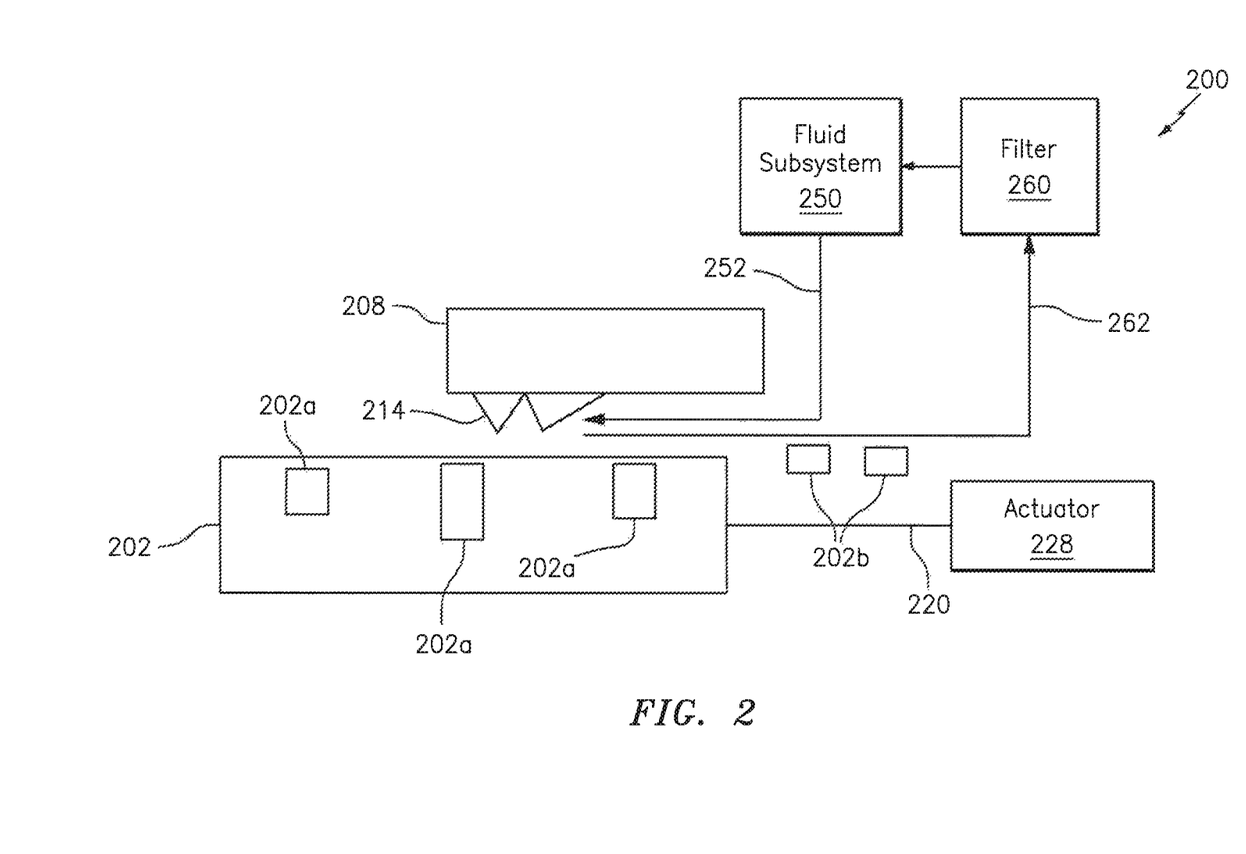
FIG. 2 illustrates a block diagram of a system incorporating a cutting tool and a workpiece in accordance with aspects of this disclosure.

The system 200 may include a spindle 220 that may support the workpiece 202. The spindle 220 may be moved (e.g., translated, rotated, etc.) in one or more dimensions relative to the cutting tool 208/edge 214 via an actuator 228 in order to engage a machining operation at a specified location of the workpiece 202. The spindle 220 and/or the actuator 228 may be included as part of a motor (e.g., motor 324a of FIG. 3) in some embodiments.

While the spindle 220 is shown in FIG. 2 as being coupled to/causing a movement of the workpiece 202 (where the cutting tool 208 is held stationary), in some embodiments the converse may apply (e.g., in some embodiments the workpiece 202 may be held stationary and, the cutting tool 208 may be coupled to/moved via the spindle 220). Still further, in some embodiments both the workpiece 202 and the cutting tool 208 may be movable as part of a machining environment.

Cutting fluid may be applied from a fluid subsystem 250 to a cutting zone/interface between the tool edge 214 and the workpiece 202 via a source channel 252. The cutting fluid may be returned to the fluid subsystem 250 via a return channel 262. In some embodiments, a filter 260 may be disposed between the return channel 262 and the fluid subsystem 250 to remove material (e.g., debris, chips 202b, etc.) that may be intermixed with the cutting fluid of the return channel 262.

Figure 2A:
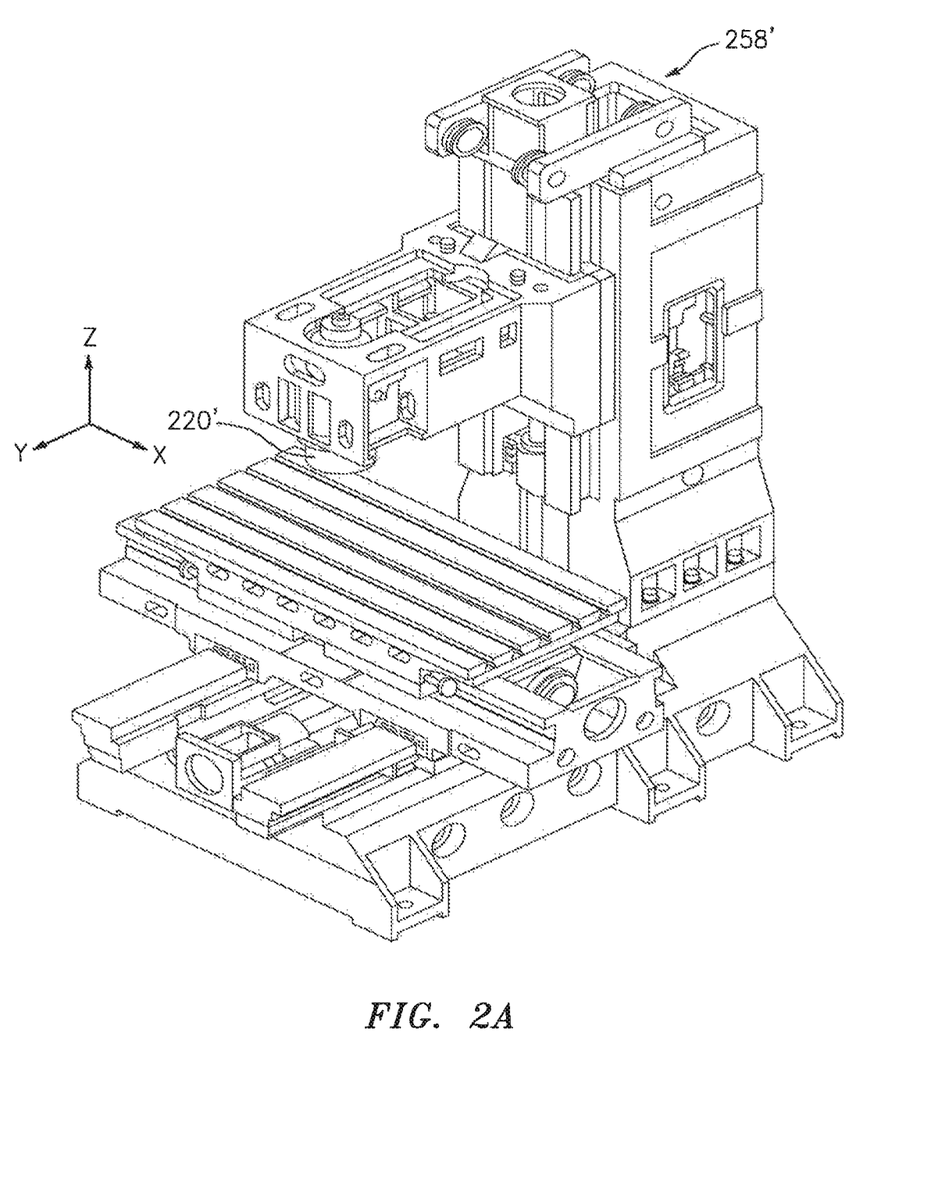
FIGS. 2A-2B illustrate embodiments of machine tools in accordance with aspects of this disclosure.

FIG. 2A illustrates a machine tool 258', which may be defined along three axes (e.g., in accordance with a Cartesian coordinate system defined by an X-axis, a Y-axis, and a Z-axis as shown in FIG. 2A). The machine tool 258' may include a spindle 220' (which may correspond to the spindle 220 of FIG. 2).

Figure 2B:
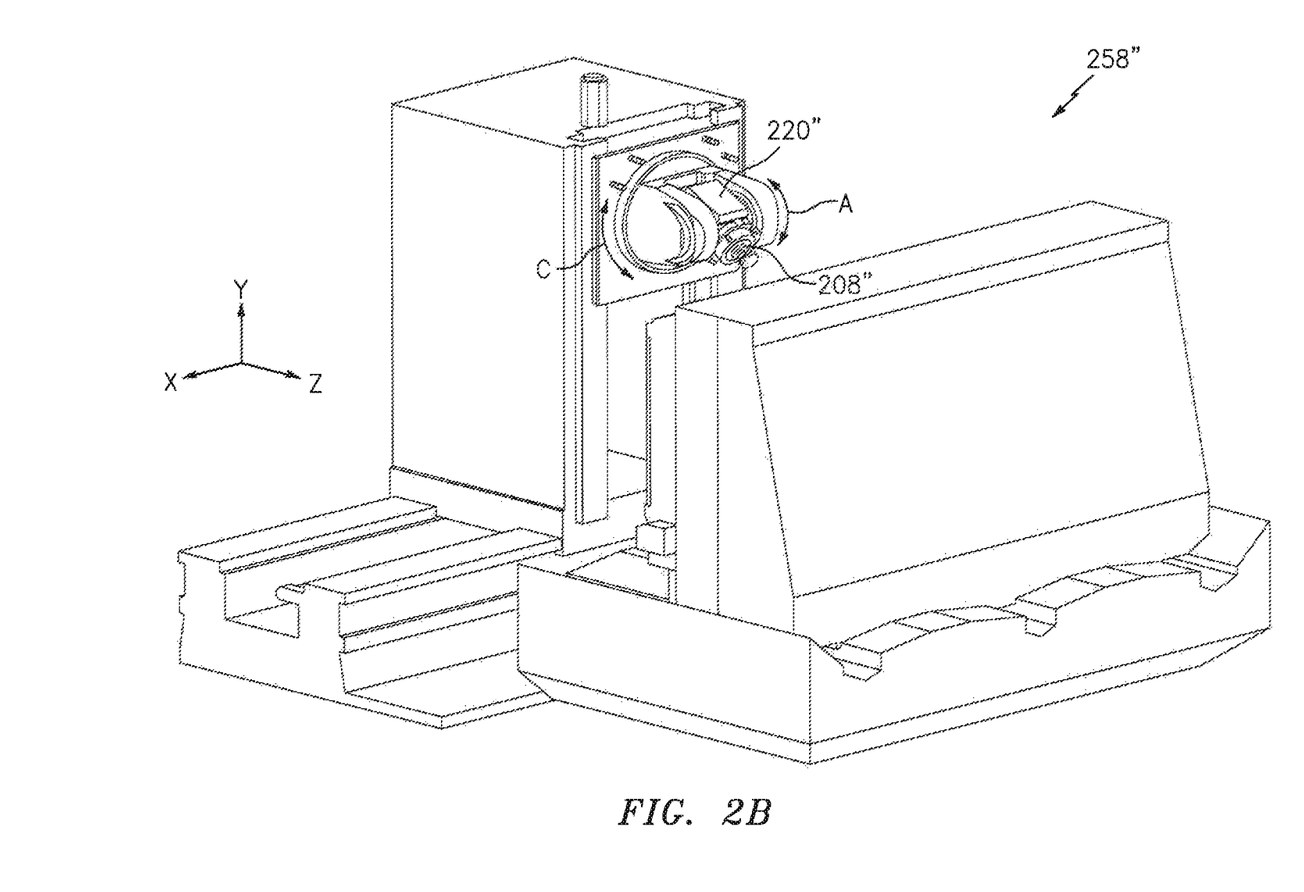

FIG. 2B illustrates a machine tool 258" in accordance with aspects of this disclosure. The machine tool 258" may incorporate one or more aspects of the system 200 described above. The machine tool 258" may incorporate a spindle 220" (which may correspond to the spindle 220 of FIG. 2 and/or the spindle 220' of FIG. 2A).

The machine tool 258" may be referred to as a 5-axis machine tool, as cutting/machining operations performed by a cutting tool 208" (which may correspond to the cutting tool 208 of FIG. 2) may be defined with respect to five axes/reference directions. For example, operations performed by the cutting tool 208" may be defined with respect to X, Y, and Z axes in a manner similar to what is shown in FIG. 2A. Additionally, operations performed by the cutting tool 208" may be defined with respect to the A and C axes/reference directions as shown in FIG. 2B.

Figure 2C:
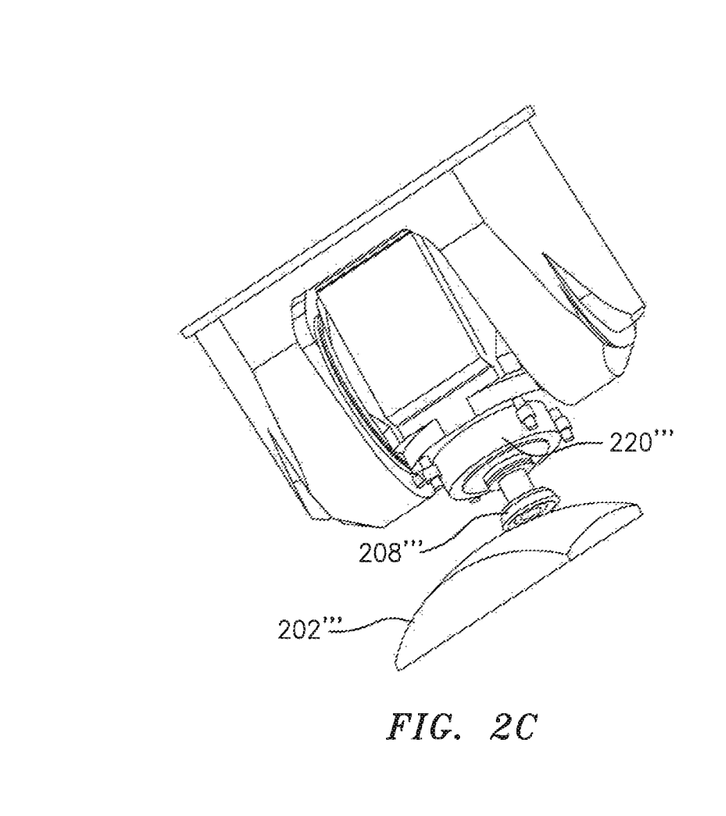
FIG. 2C illustrates an exemplary interface between a machine tool and a workpiece in accordance with aspects of this disclosure.

FIG. 2C illustrates an interface between a cutting tool 208''' and a workpiece 202'''. The cutting tool 208''' is shown in conjunction with a spindle 220''' of a machine tool.

Figure 2D:
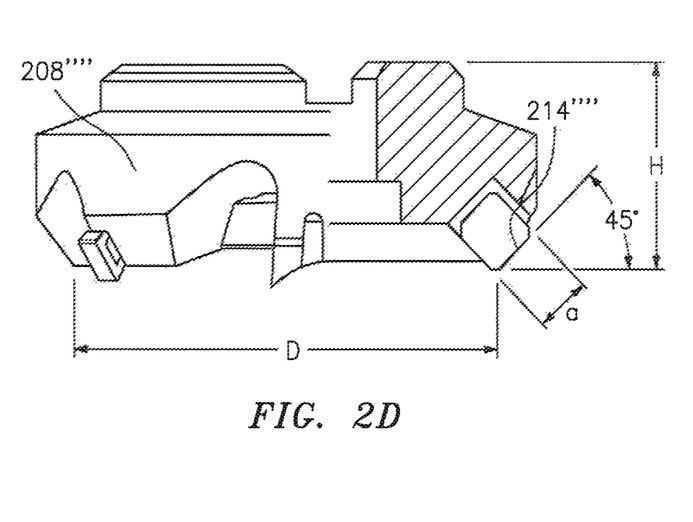
FIG. 2D illustrates parameters associated with a cutting tool in accordance with aspects of this disclosure.

FIG. 2D illustrates parameters associated with a cutting tool 208'''' in accordance with aspects of this disclosure. In particular, parameters 'D', 'a', and 'H' are shown as being defined relative to a cutting edge 214''''. The parameter 'D' is the tool diameter. The parameter 'a' represents the length of cutting edge 214''''. The parameter 'H' represents the tool length. The cutting edge 214'''' is shown in FIG. 2D as being inclined at an angle of 45 degrees relative to the horizontal, which is also called the lead angle. Other values for this angle may be used.

Figure 2E:
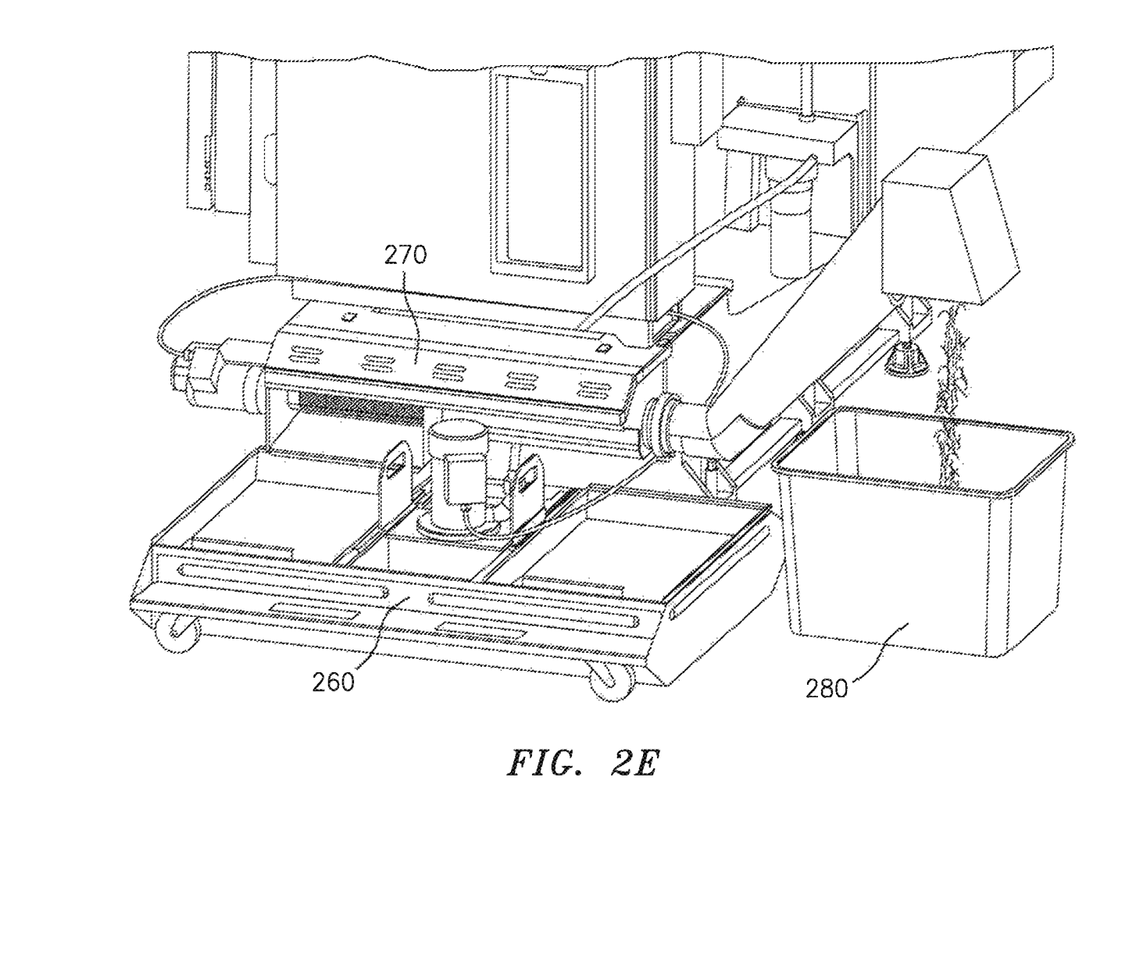
FIG. 2E illustrates a chip conveyer, a coolant tank, and a collection container of a machine tool.

Referring to FIG. 2E, aspects of a machine tool are shown. In particular, FIG. 2E illustrates a coolant tank 260 that may be used as a storage/reservoir for a fluid (e.g., a cutting fluid). Also shown in FIG. 2E is a material conveyer 270. The material conveyer 270 may convey material (e.g., chips) that are liberated from a workpiece at the cutting zone to a receptacle/container 280. One or more of the coolant tank 260, the material conveyer 270, and the receptacle 280 may be used in conjunction with one or more of the fluid subsystem 250, the source channel 252, the filter 260, or the return channel 262 of FIG. 2.

Figure 7:
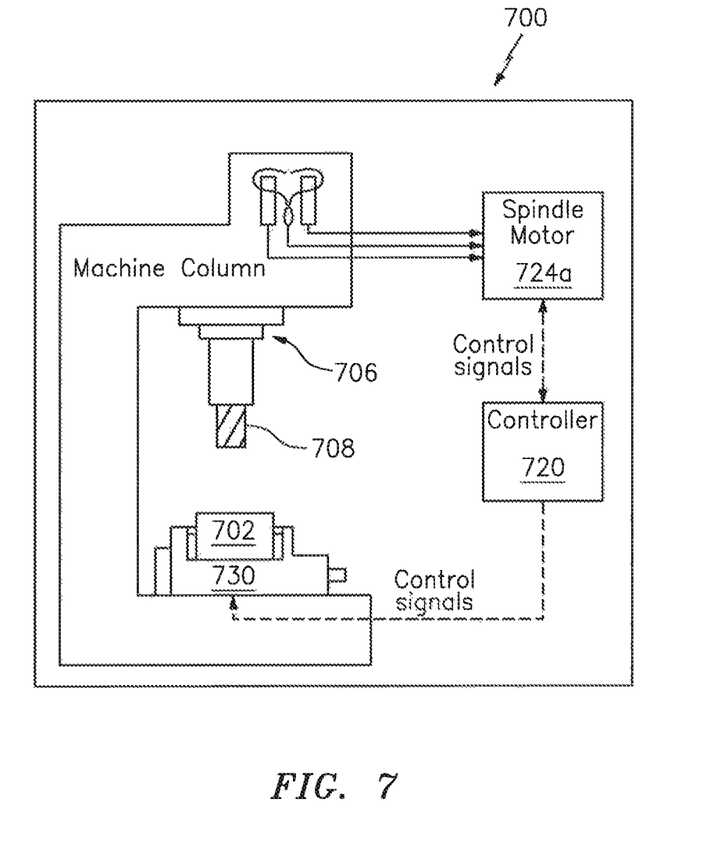
FIG. 7 illustrates a block diagram of a machine tool in accordance with aspects of this disclosure.

Referring to FIG. 7, a block diagram of a machine tool 700 is shown. The machine tool 700 may incorporate aspects of one or more of the machine tools described above in conjunction with FIG. 2 and FIGS. 2A-2E. As shown in FIG. 7, the machine tool 700 defines a machine column from which a spindle 706 and a cutting tool 708 are supported. A machine table 730 supports a workpiece 702. A spindle motor 724a may drive the spindle 706/cutting tool 708. A controller 720 (e.g. a CNC controller) may be coupled to the motor 724a and may control one or more of the cutting tool 708, the spindle 706, or the machine table 730 on the basis of an output of the spindle motor 724a.

Figure 3:
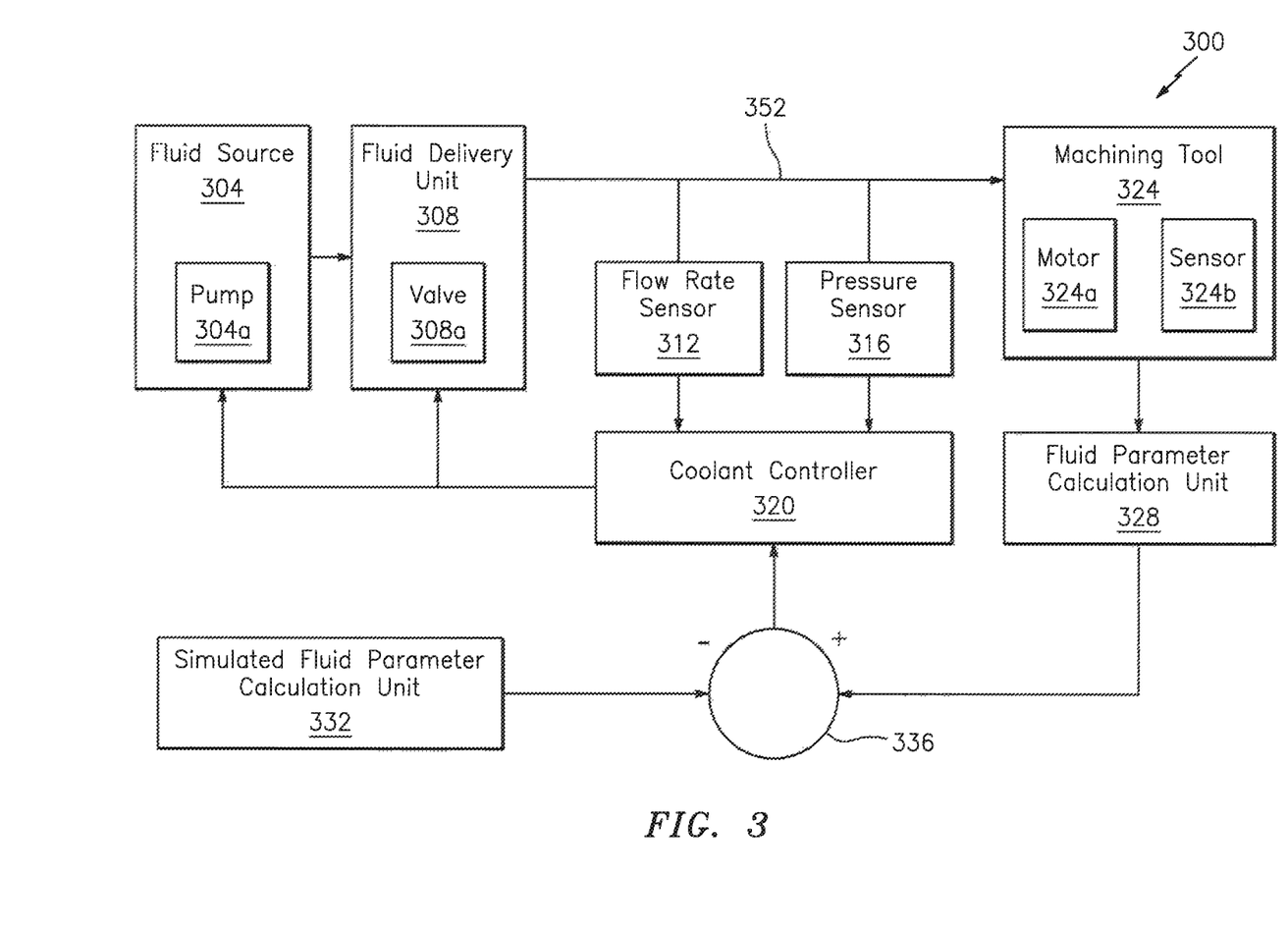
FIG. 3 illustrates a block diagram of a closed-loop system that may be used in one or more machining operations.

Referring now to FIG. 3, a system 300 that may be used to adaptively control one or more parameters of a fluid (e.g., a cutting fluid) is shown. The system 300 may include a fluid source 304, a fluid delivery unit 308, one or more flow rate sensors 312, one or more pressure sensors 316, a coolant controller 320, a machine tool 324, a fluid parameter calculation unit 328, a simulated fluid parameter calculation unit 332, and a differential calculator 336.

The fluid source 304, which may include one or more tanks, reservoirs, etc., may serve as a repository/storage of fluid (e.g., a cutting fluid used in a machining operation). The fluid source 304 may provide the fluid contained therein to a fluid delivery unit 308. In turn, the fluid delivery unit 308 may provide the fluid to the machine tool 324 via a source channel 352 (where the source channel 352 may correspond to the source channel 252 of FIG. 2). The fluid source 304 and/or the fluid delivery unit 308 may include one or more pumps (e.g., pump 304a) that may be used in the conveyance of the fluid to the machine tool 324.

The fluid source 304 and/or the fluid delivery unit 308 may include one or more valves (e.g., valve 308a) that may control one or more parameters of the fluid in terms of a delivery of the fluid from the fluid delivery unit 308 to the machine tool 324. For example, a state/position of the valve 308a (e.g., a degree/extent that the valve 308a is open [or, analogously, closed]) may be used to control/regulate a flow rate or pressure associated with the fluid.

A drive state/condition associated with the pumps (e.g., the pump 304a) and/or a state/position associated with the valves (e.g., the valve 308a) may initially be established based on parameter values calculated by the unit 332.

The fluid source 304 and the fluid delivery unit 308 may correspond to the fluid subsystem 250 (and potentially the filter 260) of FIG. 2.

The flow rate sensor 312 may measure a flow rate of the fluid in the source channel 352. The pressure sensor 316 may measure a pressure (e.g., an absolute pressure or a differential pressure) of the fluid in the source channel 352. While the measurements by the sensors 312 and 316 are described as occurring with respect to the source channel 352, the measurements may be taken with respect to another channel, such as a return channel (e.g., return channel 262 of FIG. 2). The measurements obtained by the sensors 312 and 316 may be provided to the coolant controller 320.

The machine tool 324 (which may correspond to one of the other machine tools described herein) may generate and output a signal indicative of a load on a spindle (e.g., spindle 220 of FIG. 2). For example, the signal output by the machine tool 324 may be a current signal associated with a motor 324a of the machine tool 324. The signal output by the machine tool 324 may be received by the fluid parameter calculation unit 328.

The fluid parameter calculation unit 328 may compute proper/acceptable parameter (e.g., flow rate and pressure) values for the fluid that is provided to the machine tool 324 based on the value(s) of the spindle load. For example, based on the spindle load signal provided by the machine tool 324 (as well as information/data pertaining to a depth of cut by a cutting tool [e.g., tool 208 of FIG. 2] into a workpiece [e.g., workpiece 202 of FIG. 2] and a cutting speed of the cutting tool), the unit 328 may calculate a cutting heat. Based on the calculated cutting heat (as well as an identification of materials used for the cutting tool and the workpiece), the unit 328 may calculate proper/acceptable values (or range of values) for the flow rate and pressure of the fluid provided to the machine tool 324. The parameter values calculated by the unit 328 may be provided to the differential calculator 336 as a first input of the differential calculator 336.

The simulated fluid parameter calculation unit 332 may supply parameter (e.g., flow rate and pressure) values as a second input of the differential calculator 336. The parameter values provided by the unit 332 may be based on one or more simulations/algorithms as described in further detail below.

The differential calculator 336 may compute the difference between the parameter values provided by the unit 328 and the parameter values provided by the unit 332. This difference (in terms of magnitude and direction/sign [e.g., plus or minus]) may be provided as output by the differential calculator 336 to the coolant controller 320.

The coolant controller 320 may control the fluid source 304 (e.g., the pump 304a) and/or the fluid delivery unit 308 (e.g., the valve 308a) based on the output of the differential calculator 336. For example, if the difference calculated by the differential calculator 336 exceeds one or more thresholds in terms of one or more of the parameter values, the controller 320 may issue one or more commands to the fluid source 304 or the fluid delivery unit 308 based on the same. Such commands may provide for an adjustment of the fluid delivered to the machine tool 324 by the fluid delivery unit 308 in terms of one or more parameters, e.g., flow rate or pressure. As an example, if the spindle load signal output by the machine tool 324 is indicative of a high-valued load (e.g., a load that is greater than what is predicted based on simulation), the output of the differential calculator 336 may be such that the controller 320 responds by opening the valve 308a further to increase a flow rate of the fluid in the source channel 352. Similarly, a drive of the pump 304a may be adjusted based on the output of the differential calculator 336.

As seen in FIG. 3, a closed-loop is formed between the delivery unit 308 and the machine tool 324 via the controller 320, the unit 328, the unit 332, and the differential calculator 336. Fine adjustments may be made by the controller 320 to account for differences between simulated parameter values (as provided by the unit 332) and actual, real-time values as measured/determined by the fluid parameter calculation unit 328.

The controller 320 may provide for further adjustment based on the outputs of the sensors 312 and 316. The controller 320 may monitor the outputs of the sensors 312 and 316 to ensure that steady-state conditions are satisfied. If such conditions are not satisfied, the controller 320 may take some action such as, e.g., suspending machining operations, modifying a parameter (e.g., a depth of cut) of a machining operation, etc.

While the various devices of the system 300 shown in FIG. 3 are described above as being separate devices, in some embodiments one or more of the devices may be combined. For example, in some embodiments, the controller 320, the unit 328, the unit 332, and the differential calculator 336 may be at least partially combined as part of a controller/computing platform.

Figure 4:
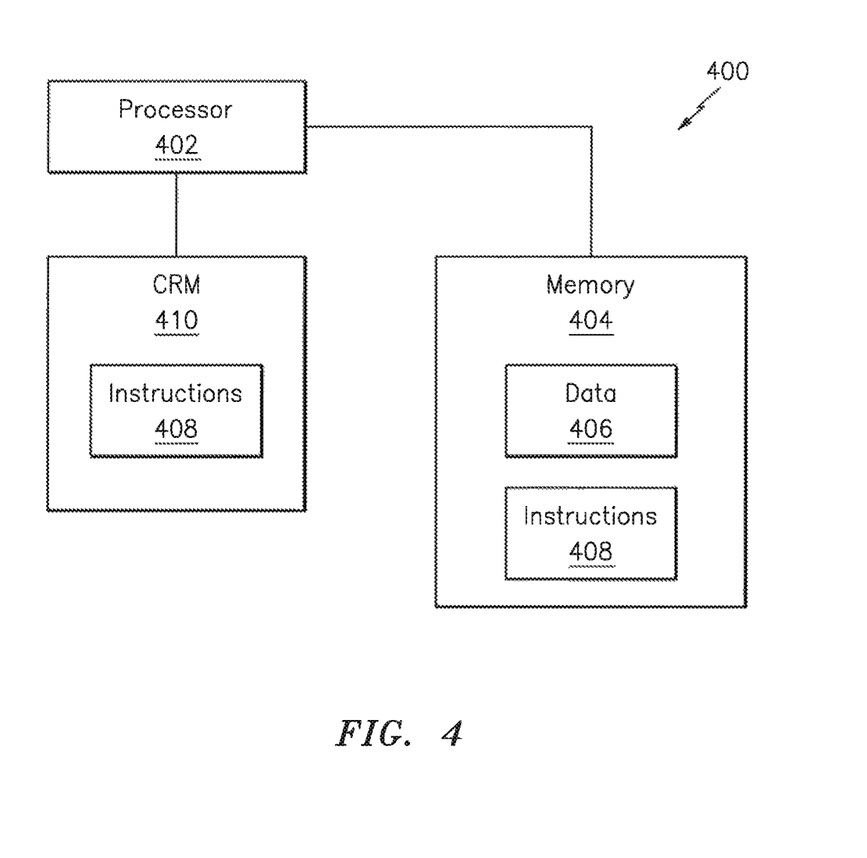
FIG. 4 illustrates a block diagram of a computing system in accordance with aspects of this disclosure.

For example, FIG. 4 illustrates a computing system 400 that may incorporate aspects of one or more of the devices described above. The system 400 includes one or more processors (generally shown by a processor 402) and a memory 404. The memory 404 may store data 406 and/or instructions 408. The system 400 may include a computer-readable medium (CRM) 410 that may store some or all of the instructions 408. The CRM 410 may include a transitory and/or a non-transitory computer-readable medium.

The data 406 may include one or more parameters that may be associated with the operation of a machine tool. For example, the parameters may include an identification of a material of a workpiece, a material of a tool, an identification of a component formed from the workpiece, a type of fluid (e.g., cutting fluid) that is used, etc. The parameters may be stored as part of a configuration file.

The instructions 408, when executed by the processor 402, may cause the system 400 to perform one or more methodological acts or processes, such as those described herein. As an example, execution of the instructions 408 may cause the system 400 to control one or more operations of the system 200 of FIG. 2 and/or one or more operations of the system of FIG. 3.

Figure 5:
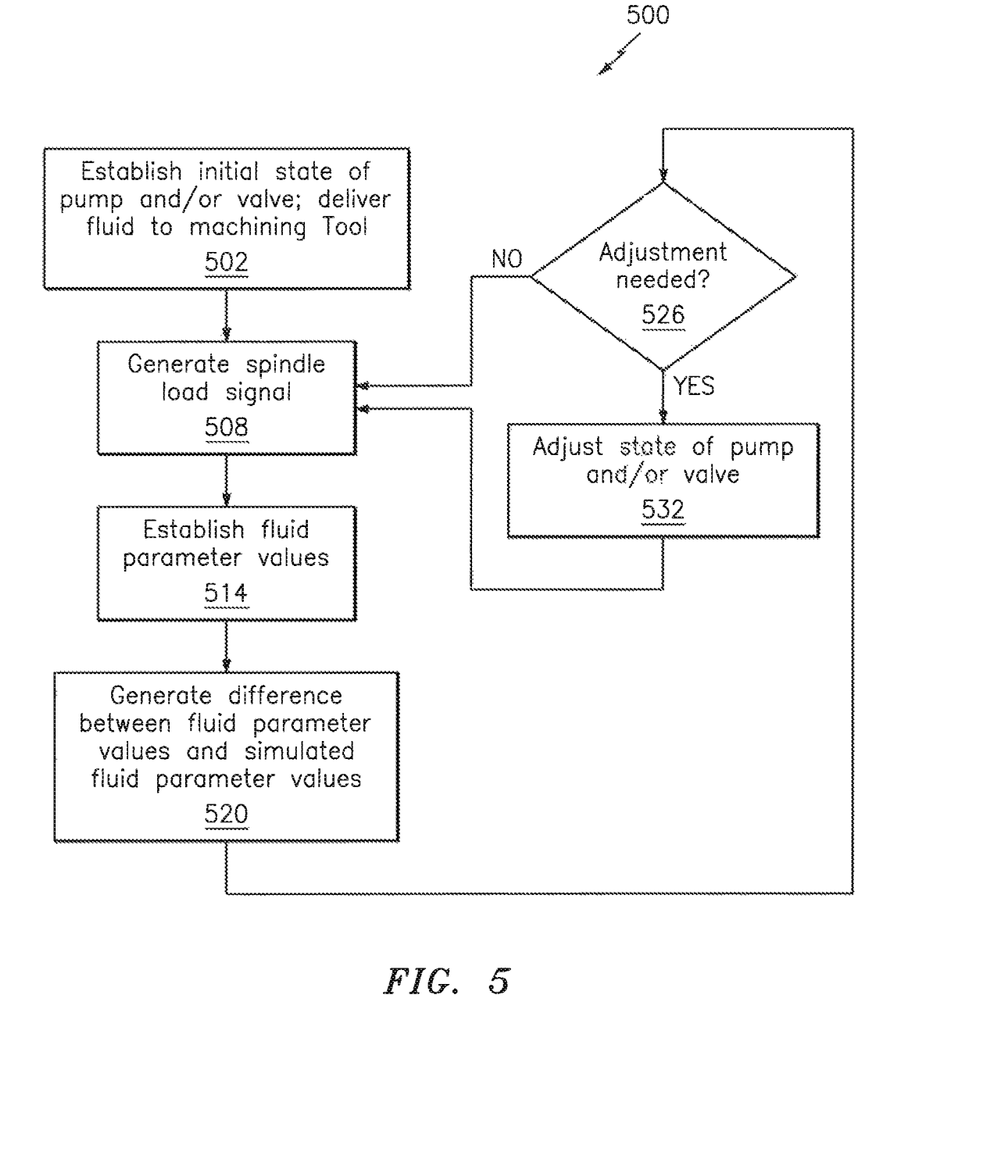
FIG. 5 illustrates a flow chart of a method for controlling parameters of fluid in the system of FIG. 3.

Referring to FIG. 5, a method 500 for controlling one or more parameters (e.g., a flow rate, a pressure, etc.) of the fluid in the system 300 of FIG. 3 is shown.

In block 502, initial values/states/conditions for the pump 304*a* and/or the valve 308*a* may be established based on values provided by, e.g., the unit 332. The initial states may be based on, e.g., an identification of a material of a workpiece, a material of a tool, an identification of a component formed from the workpiece, a type of fluid (e.g., cutting fluid) that is used, etc. As part of block 502, fluid may be delivered by, e.g., the fluid delivery unit 308 to the machine tool 324.

In block 508, a spindle load signal may be generated and output by the machine tool 324. One or more sensors (e.g., a current sensor see sensor 324*b* of FIG. 3 may be used to generate the spindle load signal. The spindle load signal may be based on cutting a node (e.g., node 202*a* of FIG. 2) of a workpiece (e.g., workpiece 202 of FIG. 2) by the machine tool 324.

In block 514, the unit 328 may establish one or more fluid parameter values based on the spindle load signal of block 508.

In block 520, the differential calculator 336 may generate a difference between the fluid parameter values of block 514 and simulated fluid parameter values output by the unit 332.

In block 526, the controller 320 may determine if an adjustment to the values/states/conditions associated with the pump 304*a* and/or the valve 308*a* is appropriate based on the output of the differential calculator 336. The determination by the controller 320 in block 526 may be based on the output of the sensor 312 and/or the output of the sensor 316. If an adjustment is needed, execution of the method 500 may proceed from block 526 to block 532; otherwise, execution of the method may proceed from block 526 to block 508.

In block 532, an adjustment to a state of the pump 304*a* and/or the valve 308*a* may be provided. A degree of the adjustment (in terms of magnitude or direction) may be based on the difference generated in block 520.

Figure 6:
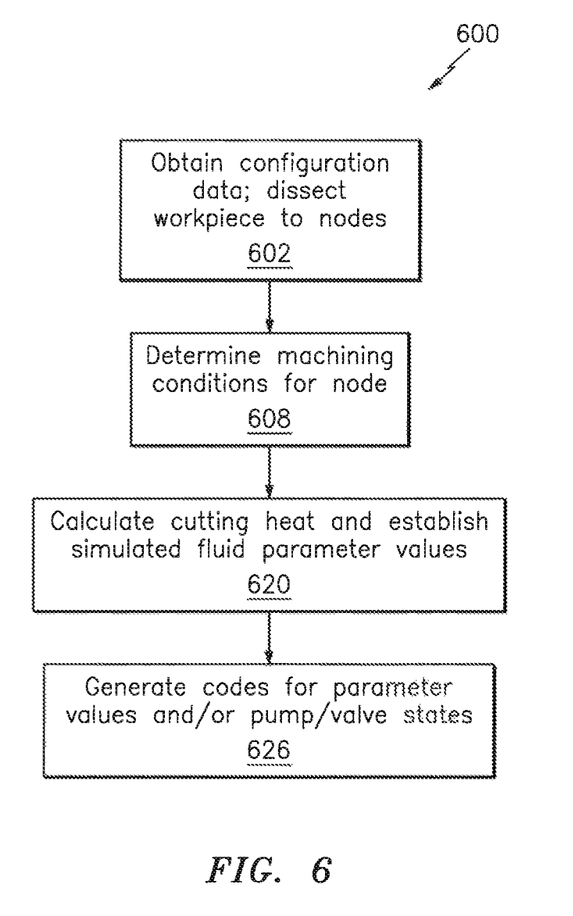
FIG. 6 illustrates a flow chart of a method for determining values of one or more fluid parameters as part of a simulation in accordance with aspects of this disclosure.

Referring to FIG. 6, a flow chart of a method 600 for computing/determining values (e.g., simulated values) of block 502 and block 520 of FIG. 5 is shown.

In block 602, configuration data associated with a machining operation may be obtained. The configuration data may include an identification of a component that is to be fabricated, an identification of a material of a workpiece from which the component is fabricated, an identification of a material of a tool used in fabricating the component from the workpiece, one or more specifications of the tool (e.g., spindle speed), chip loads, etc. The workpiece may be dissected/broken-down into discrete nodes (e.g., nodes 202*a* of FIG. 2). A dimension of a particular node may be based on a resolution associated with the machine tool.

In block 608, machining conditions for a given node of the workpiece may be determined. The machining conditions may include an identification of whether machining is to occur with respect to a node, an identification of an orientation of (a cutting edge of) the tool relative to the node, a depth of cut that may be made, a cutting force that may be required, etc.

In block 620, a cutting heat may be calculated based on the machining conditions determined in block 608. Simulated fluid parameter values (e.g., a flow rate value, a pressure value, etc.) may be established based on the calculated cutting heat.

In block 626, one or more codes may be generated in a file. The codes may be indicative of the simulated fluid parameter values determined in block 620. In some embodiments, the codes may include an identification of operational states of one or more entities (e.g., a pump, a valve, a conveyor, etc.).

As reflected by the flow in the execution from block 626 to block 608, the loop associated with the blocks 608, 620, and 626 may be repeated for each node, in this manner, a file may be generated that captures a code for each node of the workpiece.

If, in block 608, a determination is made that machining is not to occur with respect to a given node (or subset of nodes that are proximate one another), the code for that node(s) may indicate that hardware associated with the conveyance of the fluid may be disabled/disengaged. For example, the code may indicate that a pump (e.g., pump 304*a* of FIG. 3) and/or chip filtration/conveyance hardware (e.g., filter 260 of FIG. 2, material conveyer 270 of FIG. 2E) may be disabled for a given node or subset of nodes.

Additionally, the codes of block 626 may be adapted to account for any lag time in terms of a response of a device relative to a transmission or receipt of a given command. For example, if the valve 308*a* of FIG. 3 incurs a lag time from receipt of a command until assuming a state/position associated with the command, the codes of block 626 may be adjusted/adapted to account for the lag time.

In some embodiments, the codes generated in block 626 may be modified as additional data becomes available. For example, and referring to FIGS. 3 and 6, as outputs of the unit 328 or the differential calculator 336 become available, the values stored by the unit 332 (which may correspond to/include the codes of block 626 of FIG. 6) may be adjusted (potentially as part of a machine learning algorithm). In this manner, the simulation/modeling provided by the unit 332 (in conjunction with the method 600 of FIG. 6) may be adapted/updated to more closely conform to actual/experienced machining conditions. In this manner, any error/difference between the outputs of the unit 332 and the outputs of the unit 328 may tend to converge to zero over time as experience in machining is obtained.

In accordance with aspects of this disclosure, machining parameters (e.g., a spindle load signal) may be measured in real-time (or substantially real-time). The measured machining parameters may be used as a point of reference, such as for example following inspection or after a component has been in service for a threshold amount of time. Additional measurements performed subsequent to the reference measurements may provide indications of how components change over time, which may provide opportunities to enhance the machinability of components in the future.

Aspects of the disclosure may be used to control one or more parameters associated with a fluid used in a machining operation. Based on such control, a reduction in power on the order of, e.g., 50% may be realized relative to conventional fluid management systems. Additionally, a reduction in terms of usage and waste of fluid may be realized, providing tier a more benign machining environment. Aspects of the disclosure may protect against excessive loads being applied to a tool while enhancing component surface quality/finish. In this respect, tool lifetime may be increased/enhanced relative to conventional techniques. Additionally, a thermal shock cycle with respect to a tool may be avoided based on a fine adjustment/resolution of fluid that is applied to a cutting zone/tool-workpiece interface.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A system comprising:
   a machine tool that includes a cutting tool;
   a fluid subsystem that provides fluid to the cutting tool; and
   at least one processor that executes instructions that cause the at least one processor to:
      calculate a cutting heat of the cutting tool based on a load signal from the machine tool and at least one machining condition for a node of a plurality of discrete nodes of a workpiece;
      calculate acceptable values for one or both of a flow rate and a pressure of the fluid based on the load signal;
      establish simulated values of the one or both of the flow rate and the pressure of the fluid that are based on a simulation using the calculated cutting heat for the node;
      determine a difference between the first acceptable values and the simulated values; and
      adjust a state of a device of the fluid subsystem based on the determined difference to adjust the one or both of the flow rate and the pressure of the fluid;
   wherein the simulation is configured to dissect the workpiece into the plurality of discrete nodes and wherein a dimension of each node of the plurality of discrete nodes is based on a resolution of the machine tool.

2. The system of claim 1, wherein the device includes a pump, and wherein a drive of the pump is adjusted based on the determined difference.

3. The system of claim 1, wherein the device includes a valve, and wherein a degree that the value is open is adjusted based on the determined difference.

4. The system of claim 1, further comprising:
   the workpiece,
   wherein the simulated values are further based on one or more of a material of the workpiece, a material of the cutting tool, an identification of a type of the fluid, a spindle speed associated with the machine tool, and a chip load.

5. The system of claim 1, further comprising:
   the workpiece;
   a channel coupled to the fluid subsystem; and
   a filter that filters material that is liberated from the workpiece in the channel,
   wherein the channel returns the fluid to the fluid subsystem.

6. The system of claim 1, further comprising:
   a flow rate sensor; and
   a pressure sensor,
   wherein the adjusted state of the device of the fluid subsystem is further based on a flow rate output by the flow rate sensor and a pressure output by the pressure sensor.

7. The system of claim 1, wherein the load signal is a spindle load of a motor of the machine tool.

8. A method comprising:
   establishing a first state of a device included in a fluid subsystem;
   delivering, by the fluid subsystem, fluid to a cutting tool of a machine tool at a flow rate and a pressure based on the first state;
   calculating a cutting heat of the cutting tool based on a load signal from the machine tool and at least one machining condition for a node of a plurality of discrete nodes of a workpiece;
   calculating acceptable values for one or both of the flow rate and the pressure of the fluid based on the load signal;
   establishing simulated values of the one or both of the flow rate and the pressure of the fluid based on the calculated cutting heat for the node;
   determining a difference between the acceptable values and the simulated values; and
   commanding, by a controller, a second state of the device based on the determined difference to adjust the one or both of the flow rate and the pressure of the fluid, the second state different from the first state.

9. The method of claim 8, wherein the device includes a pump, and wherein a drive of the pump is adjusted based on the determined difference.

10. The method of claim 9, wherein the adjustment of the drive of the pump includes shutting off the pump.

11. The method of claim 8, wherein the device includes a valve, and wherein a degree that the value is open is adjusted based on the determined difference.

12. The method of claim 8, further comprising:
    cutting the node of the plurality of discrete nodes of the workpiece with the cutting tool to generate at least one chip that is liberated from the workpiece,
    wherein the simulated values of the one or both of the flow rate and pressure of the fluid are based on a material of the workpiece, a material of the cutting tool, an identification of a type of the fluid, a spindle speed associated with the machine tool, a chip load associated with the at least one chip, a cutting depth into the workpiece at the node, an identification of an orientation of a cutting edge of the cutting tool relative to the node, and a cutting speed of the cutting tool.

13. The method of claim 8, wherein the second state of the device accounts for a lag time between a first time corresponding to when a command is received by the device and a second time corresponding to a response to the command by the device.

14. The method of claim 8, further comprising:
  establishing a third value of the one or both of the flow rate and the pressure of the fluid based on the determined difference; and
storing, in a memory, the third value.

\* \* \* \* \*

UNITED STATES PATENT AND TRADEMARK OFFICE
CERTIFICATE OF CORRECTION

PATENT NO. : 10,807,209 B2  
APPLICATION NO. : 15/916683  
DATED : October 20, 2020  
INVENTOR(S) : Wang et al.

Page 1 of 1

It is certified that error appears in the above-identified patent and that said Letters Patent is hereby corrected as shown below:

In the Claims

Column 11, Line 49, Claim 1 before "acceptable" please delete "first"

Signed and Sealed this
Seventeenth Day of November, 2020

Andrei Iancu
*Director of the United States Patent and Trademark Office*